June 28, 1949.   A. D. MAURY ET AL   2,474,541
AUTOMATIC FISHING REEL
Filed Oct. 2, 1946
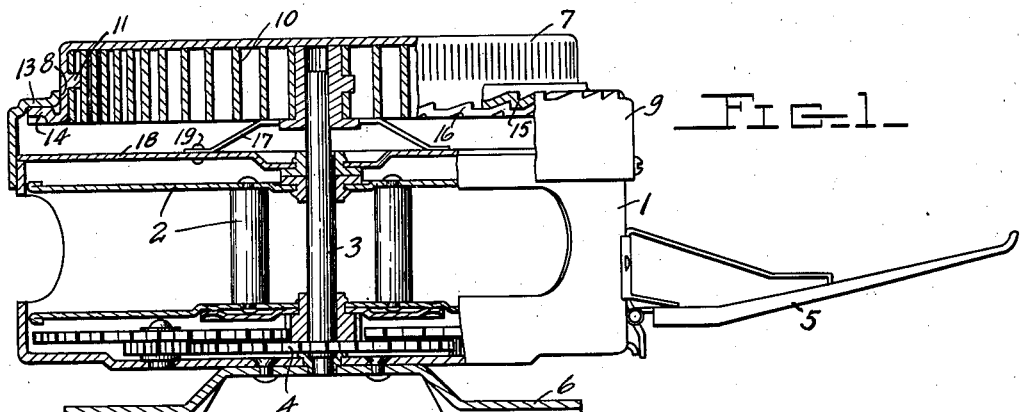
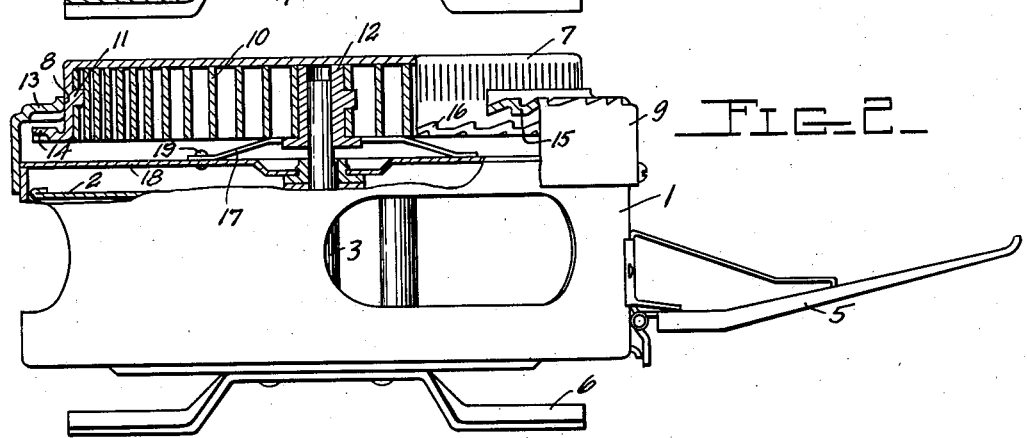
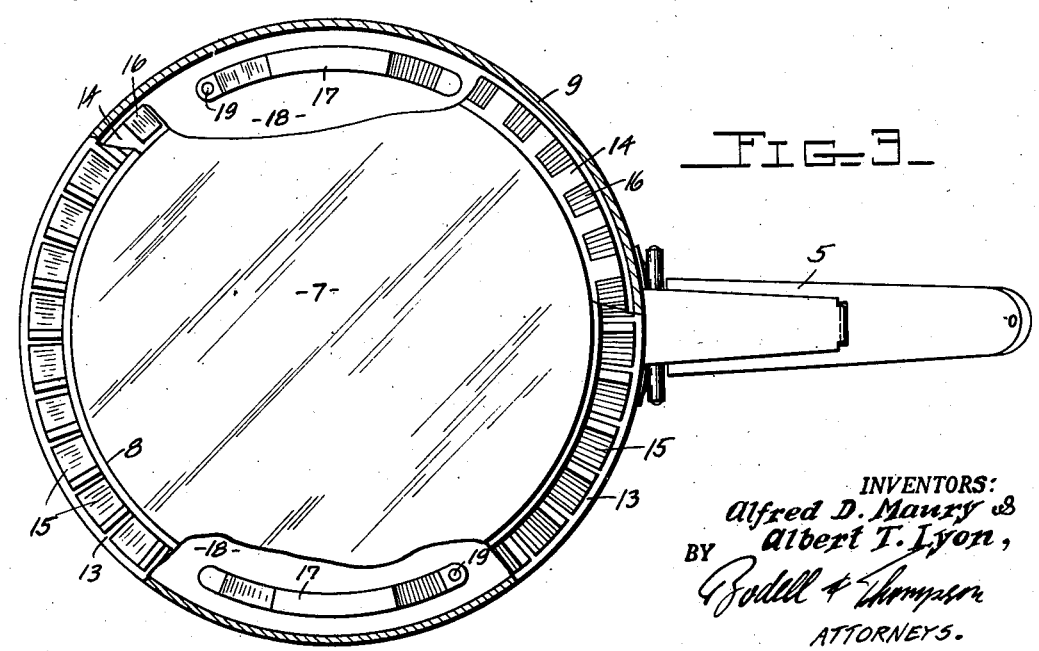
INVENTORS:
Alfred D. Maury &
Albert T. Lyon,
BY
ATTORNEYS.

Patented June 28, 1949

2,474,541

UNITED STATES PATENT OFFICE 2,474,541

AUTOMATIC FISHING REEL

Alfred David Maury, Ilion, and Albert T. Lyon, Mohawk, N. Y.

Application October 2, 1946, Serial No. 700,750

4 Claims. (Cl. 242—84.3)

This invention relates to automatic fishing reels embodying a line winding spring and winding member for loading or tensioning the spring, and has for its object spring loading mechanism embodying a spring winding member, which is shiftable axially to unload the spring. More specifically, it has for its object a normally engaged clutch, which is disengageable to unload the spring of the reel by inward axial shifting of the winding member by hand pressure applied to the outer side of the winding member.

The invention further has for its object the providing of one face of the clutch on the winding member.

The invention consists in the novel features and in the combinations and constructions hereinafter set forth and claimed.

In describing this invention, reference is had to the accompanying drawings, in which like characters designate corresponding parts in all the views.

Figure 1 is an elevation, partly in section, of this reel showing the parts of the clutch in normally engaged position.

Figure 2 is a view, similar to Figure 1, showing the clutch disengaged by the axial shifting of the winding member or cap to unload the spring.

Figure 3 is a plan view looking downward in Figure 1 or Figure 2, parts being broken away.

The novel feature of this fishing reel is the unloading of the line winding spring by an axial shifting movement of the winding member or cap to disengage clutch means and permit the spring to unload or unwind, the axial shifting being effected by the pressure of the fingers of the hand holding the reel on the outer wall or head of the winding member, which is in the form of a drum or cup enclosing the spring, and also to permit the spring to be wound or loaded by the turning of the cap in the usual manner.

The fishing reel is of the general construction shown in Maury Patents Nos. 2,175,756, issued October 10, 1939, and 2,301,732, issued November 10, 1942.

1 designates the body or housing of the reel, which is generally cylindrical in cross-section; 2 the spool or reel itself on which the line is wound. 3 designates the spindle suitably mounted in the housing, on which the reel is mounted. 4 designates gearing between the spindle and the reel 2 and the spindle and brake and clicker mechanism. 5 designates a finger operated lever for controlling the application of the brake acting directly or indirectly on the spool or reel. 6 is a suitable seat or bracket on the housing for mounting the housing on the handle of a fish pole.

7 designates the operating member or cap for the spring winding mechanism, this being mounted in a circular opening 8 in an annular portion 9 of one side of the housing. 10 designates a plane-spiral spring located in the winding member 7 and anchored at its outer end at 11 to the cylindrical wall thereof and at its inner end to a member or sleeve 12 slidably mounted on the spindle 3 to rotate the spindle or rotate with the spindle. The annular portion 9 of the housing is provided with an inwardly extending annular flange 13 and the winding member or cap 7 is provided with an outwardly extending annular rim flange 14 located within the annular portion 9 of the housing and opposed to the flange 13, these flanges coacting to have a clutch action and being disengageable to release the clutch to unload the spring 10. The clutch normally prevents retrograde action of the winding member or cap 7 but permits forward winding action to tension the spring, when the cap is being turned by hand, and holds the cap from turning, when the spring is to be wound or loaded under the pull of the line, and consequent turning of the spool 2 and the spindle 3. As here shown, these opposing flanges are formed with ratchet teeth 15, 16, respectively, forming the clutch faces. These clutch faces are held normally engaged by springs acting on the rim of the cap 7 to press the same outwardly and hence press the flanges into engagement with each other. Two of these springs 17 are shown located diametrically opposite each other. They are shown as bow springs interposed between an inner wall 18 of the casing and the rim flange 14 of the cap 7. The springs slidably engage the flange 14 and each is anchored at one end at 19 to the inner wall 18, so as to normally press the cap axially outward.

When the fish takes the bait and runs away, the spool is turned and winds the spring. The spring re-acts to take up the slack when the fish swims toward the fisherman, and when the pull of the spring is greater than the pull of the fish. This spring may be rewound by turning the cap, the periphery of which is knurled.

By this invention, the spring may be quickly unloaded to free the line by pressure of the thumb or fingers on the head of the cap 7 to press it inwardly to disengage the clutch faces on the flanges 13 and 14. When more or less or fully unloaded, the spring can then be again fully tensioned by turning the winding member 7.

What we claim is:

1. In an automatic fishing reel which includes a housing for attachment to the handle of a fish pole, a line spool, a rotatable spindle mounted in the housing on which the spool is mounted and with which it rotates, the housing including an annular portion concentric with the spindle and having an inwardly extending flange, a winding member in the form of a cap extending into the housing and having a rim flange opposed to the former flange, a coiled spring within the cap and anchored at its outer end to the cap and at its inner end to a motion transmitting part on one end of the spindle, the two flanges being provided with means for permitting winding of the spring by the cap and holding the cap from retrograde motion, said flanges being disengageable by an inward axial movement of the cap, and a spring for forcing the cap outwardly to hold the flanges engaged.

2. In an automatic fishing reel which includes a housing for attachment to the handle of a fish pole, a line-spool, a rotatable spindle mounted in the housing on which the spool is mounted and with which it rotates, the housing including an annular portion concentric with the spindle and having an inwardly extending flange, a winding member in the form of a cap extending into the housing and having a flange opposed to the former flange, a coiled spring within the cap and anchored at its outer end to the cap and at its inner end to a motion transmitting part on one end of the spindle, the two flanges being provided with means for permitting winding of the spring by the cap and holding the cap from retrograde motion, said flanges being disengageable by an inward axial movement of the cap, and a spring for forcing the cap outwardly to hold the flanges engaged, the spring being located between the flange of the cap and the flange of the internal wall of the housing within said annular portion.

3. In an automatic fishing reel which includes a housing for attachment to the handle of a fish pole, a line spool, a rotatable spindle mounted in the housing on which the spool is mounted and with which it rotates, the housing including an annular portion concentric with the spindle and having an inwardly extending flange, a winding member in the form of a cap extending into the housing and having a flange opposed to the former flange, a coiled spring within the cap and anchored at its outer end to the cap and at its inner end to a motion transmitting part on one end of the spindle, the two flanges being provided with means for permitting winding of the spring by the cap and holding the cap from retrograde motion, said flanges being disengageable by an inward axial movement of the cap, and a spring for forcing the cap outwardly to hold the flanges engaged, the springs being bow springs thrusting against the flange of the cap and an internal wall of the housing within the annular portion.

4. In an automatic fishing reel which includes a housing for attachment to the handle of a fish pole, a line spool, a spindle mounted in the housing on which the spool is mounted and with which it rotates, the housing including an annular portion concentric with the spindle and having an inwardly extending flange, a winding member in the form of a cap extending into the housing and having a rim flange opposed to the former flange, a coiled spring within the cap and anchored at its outer end to the cap and at its inner end to a motion transmitting part on one end of the spindle, the two flanges being provided with means for permitting winding of the spring by the cap and holding the cap from retrograde motion, said flanges being disengageable by an inward axial movement of the cap, spring means for pressing the cap outwardly to hold the flanges engaged, the flanges being provided with opposing ratcheting surfaces providing a toothed clutch between the cap and the casing permitting ratcheting of the cap during the winding operation by the cap.

ALFRED DAVID MAURY.
ALBERT T. LYON.

REFERENCES CITED

The following references are of record in the file of this patent:

UNITED STATES PATENTS

| Number | Name | Date |
|---|---|---|
| 897,977 | Grant | Sept. 8, 1908 |